United States Patent
Liu et al.

(10) Patent No.: US 11,271,514 B2
(45) Date of Patent: Mar. 8, 2022

(54) IMPACT PROTECTION CONTROLLER FOR ELECTRIC HEIGHT-ADJUSTABLE DESK

(71) Applicant: OKIN REFINED ELECTRIC TECHNOLOGY CO., LTD, Zhejiang (CN)

(72) Inventors: Hui Liu, Zhejiang (CN); Shiguang Xue, Zhejiang (CN); Long Li, Zhejiang (CN)

(73) Assignee: DEWERTOKIN TECHNOLOGY GROUP CO., LTD, Zhejiang (CN)

( * ) Notice: Subject to any disclaimer, the term of this patent is extended or adjusted under 35 U.S.C. 154(b) by 0 days.

(21) Appl. No.: 16/616,245

(22) PCT Filed: Jun. 20, 2017

(86) PCT No.: PCT/CN2017/089089
§ 371 (c)(1),
(2) Date: Nov. 22, 2019

(87) PCT Pub. No.: WO2018/214194
PCT Pub. Date: Nov. 29, 2018

(65) Prior Publication Data
US 2020/0136551 A1 Apr. 30, 2020

(30) Foreign Application Priority Data
May 25, 2017 (CN) .......................... 201720592545.5

(51) Int. Cl.
*H02P 29/10* (2016.01)
*H02P 29/40* (2016.01)
*A47B 9/00* (2006.01)

(52) U.S. Cl.
CPC ................ *H02P 29/10* (2016.02); *A47B 9/00* (2013.01); *H02P 29/40* (2016.02); *A47B 2200/006* (2013.01); *A47B 2200/0056* (2013.01)

(58) Field of Classification Search
CPC ................................ H02P 29/10; H02P 29/40
(Continued)

(56) References Cited

U.S. PATENT DOCUMENTS 5,475,291 A * 12/1995 Yoshida ............... G05B 13/024
318/568.22
5,736,824 A * 4/1998 Sato ..................... G05B 19/416
318/560
(Continued)

FOREIGN PATENT DOCUMENTS

| CN | 2549807 | 5/2003 |
| CN | 201467046 | 5/2010 |

(Continued)

OTHER PUBLICATIONS

International Search Report issued by the Chinese Patent Office in International Application PCT/CN2017/089089 dated Feb. 6, 2018.

*Primary Examiner* — David Luo
(74) *Attorney, Agent, or Firm* — Henry M. Feiereisen LLC

(57) ABSTRACT

An impact protection controller for an electric height-adjustable desk. The controller comprises an MCU, a motor drive circuit, a motor current sampling circuit, a current amplifier circuit, a Hall pulse generator, and a Hall filter. The MCU controls the motor drive circuit. A signal transmitted by the Hall pulse generator is sent to the MCU via the Hall filter. A motor current is sampled by the motor current sampling circuit, and the result is sent to the MCU via the current amplifier circuit to detect a change of the current. The controller further comprises a shock switch provided (Continued)

outside of and connected to the MCU, or provided inside of the MCU. The present invention combines current detection and shock detection to improve sensitivity and reliability of impact protection.

8 Claims, 3 Drawing Sheets

(58) Field of Classification Search
USPC .................................................. 318/474, 445
See application file for complete search history.

(56) References Cited

U.S. PATENT DOCUMENTS

| | | | |
|---|---|---|---|
| 7,068,002 B2* | 6/2006 | Tsutsui | G05B 19/19 |
| | | | 318/560 |
| 8,072,181 B2* | 12/2011 | Koch | H02P 7/293 |
| | | | 318/808 |
| 9,993,069 B2* | 6/2018 | Hansen | A47B 9/00 |
| 2005/0082997 A1 | 4/2005 | Koch | |
| 2013/0293173 A1 | 11/2013 | Strothmann et al. | |

FOREIGN PATENT DOCUMENTS

| | | |
|---|---|---|
| CN | 104460697 | 3/2015 |
| CN | 105553341 | 5/2016 |
| CN | 106308036 | 1/2017 |
| JP | 2000-333734 | 12/2000 |

\* cited by examiner

IMPACT PROTECTION CONTROLLER FOR ELECTRIC HEIGHT-ADJUSTABLE DESK

TECHNICAL FIELD

The present invention relates to the field of electric height-adjustable desks, in particular to an impact protection controller for an electric height-adjustable desk.

BACKGROUND ART

Desk workers often sit for long periods without moving, and this easily results in damage to the spine, cervical vertebra and other parts of the body. An electric height-adjustable desk can help people who sit for long periods by giving them the option to stand and work, without holding up work or affecting health. For this reason, electric height-adjustable desks are receiving more and more attention, and are especially popular among office staff.

While being convenient and healthy for people, electric height-adjustable desks also carry potential hazards. During operation, an electric height-adjustable desk might accidentally strike another object or a person's body, damaging the object or injuring the body.

In order to eliminate this potential hazard, an impact protection function is generally designed in a controller. When an electric height-adjustable desk is struck during operation, an electric motor current will change; a control box detects the change in current, and immediately stops the movement of the height-adjustable desk or moves back by a certain distance in the reverse direction after stopping.

The method of impact protection described above relies on detection of a change in current. If protection is set to be too sensitive, i.e. such that a very small change in current triggers protection, the result will be that the height-adjustable desk will erroneously stop during operation due to current fluctuation in the electric motor itself, even in the absence of an impact; if protection is set to be too dull, i.e. such that protection is only triggered when the change in current is large, the result will be that protection will only occur when an impact occurs and a very large squeezing force is generated, but at this time it is possible that damage to an object and injury to a person's body has already been caused. In particular, when a height-adjustable desk is operating in descent under a load, the change in current will not be obvious even if high resistance is encountered due to an impact; at this time the drawbacks of this solution are even more pronounced.

CONTENT OF THE INVENTION

For the abovementioned technical problem in the prior art, the present invention provides an impact protection controller for an electric height-adjustable desk, comprising an MCU (Micro Controller Unit), an electric motor drive circuit, an electric motor current sampling circuit, a current amplification circuit, a HALL pulse generator and a HALL filter, the MCU controlling the electric motor drive circuit; a signal transmitted by the HALL pulse generator is sent to the MCU via the HALL filter; an electric motor current, after sampling by the electric motor current sampling circuit, is sent into the MCU via the current amplification circuit, and used for detecting a change in current; also included is a shock switch, disposed outside the MCU and connected to the MCU, or disposed inside the MCU.

The present invention employs a combination of current detection and shock detection, thereby increasing the sensitivity and reliability of impact protection.

DESCRIPTION OF THE ACCOMPANYING DRAWINGS

Figure 1:
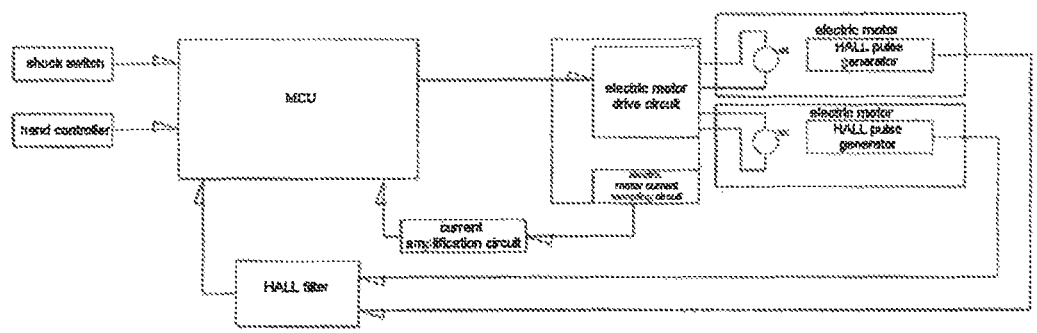
FIG. 1 is a block diagram of an impact protection controller for an electric height-adjustable desk of the present invention.
Figure 2:
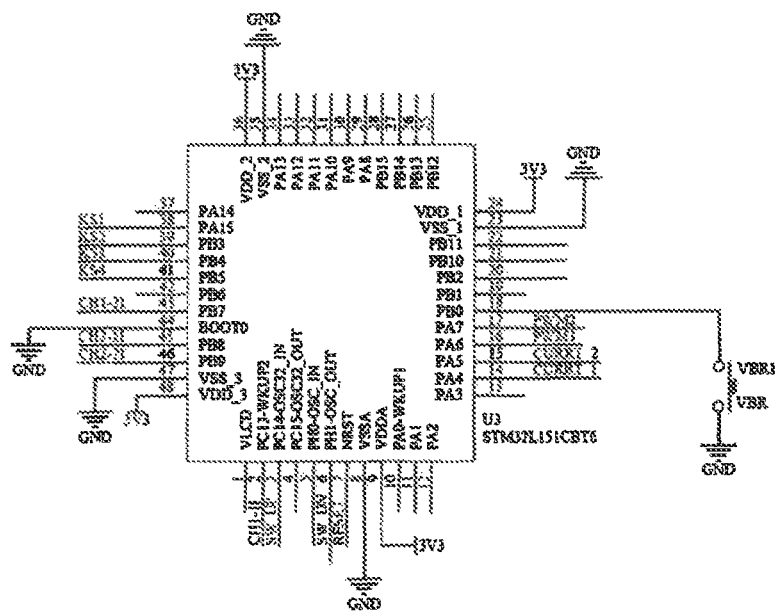
FIG. 2 is a circuit diagram of an MCU (by way of example STM32L151CBT6) and a shock switch disposed outside the MCU.
Figure 3:
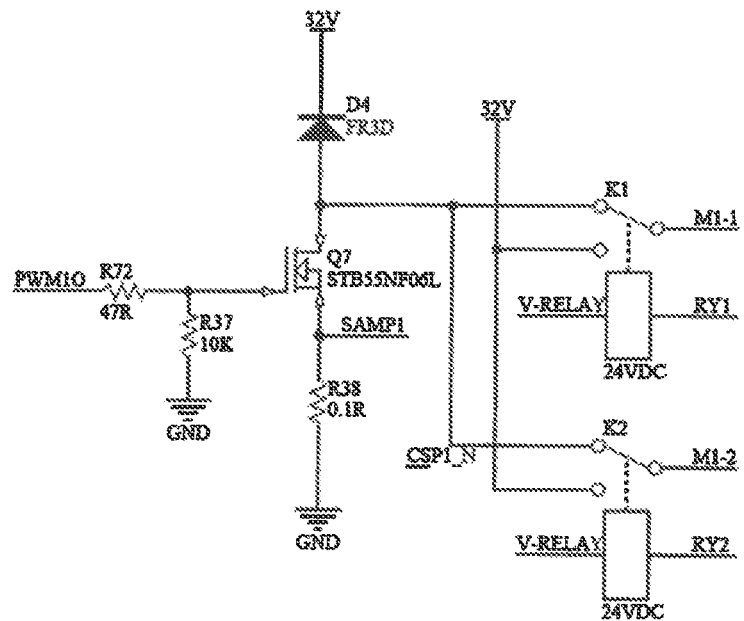
Figure 4:
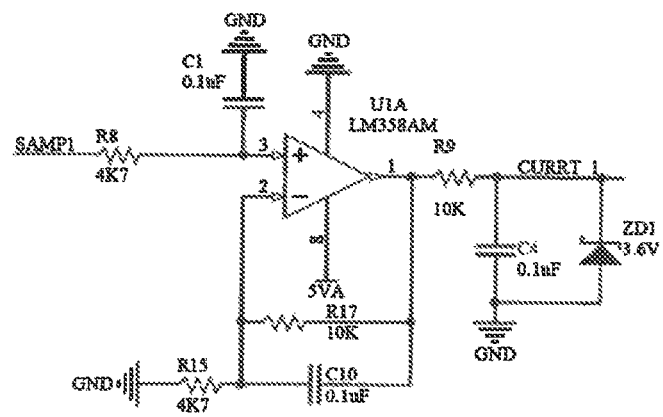
Figure 5:
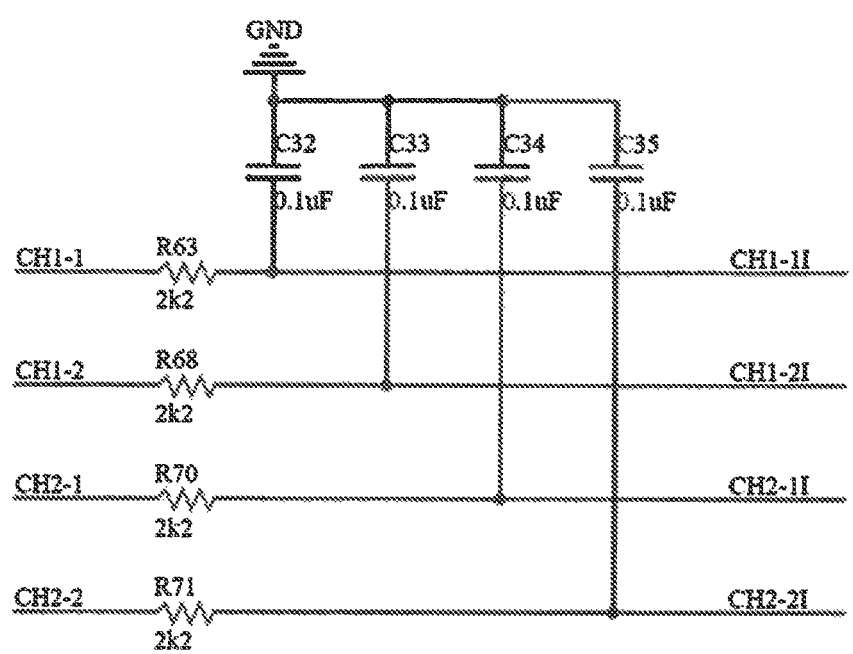

FIG. 3 is an electric motor drive circuit diagram.
FIG. 4 is a current amplification circuit diagram.
FIG. 5 is a HALL filter circuit diagram.

PARTICULAR EMBODIMENTS

The present invention is explained further below with reference to the accompanying drawings.

As shown in FIGS. 1-5, an impact protection controller for an electric height-adjustable desk of the present invention comprises an MCU, an electric motor drive circuit, an electric motor current sampling circuit, a current amplification circuit, a HALL pulse generator and a HALL filter; the MCU controls the electric motor drive circuit, adjusting an electric motor speed by PWM (Pulse Width Modulation); a signal transmitted by the HALL pulse generator passes through the HALL filter to filter out motor noise, and is sent to the MCU; a HALL signal reflects the number of revolutions of the electric motor, and the MCU can thereby learn electric motor speed and position; an electric motor current, after sampling by the electric motor current sampling circuit, is sent into the MCU via the current amplification circuit, and used for detecting a change in current. Also included is a shock switch, disposed outside the MCU and connected to the MCU, or disposed inside the MCU. An n-channel MOSFET Q7 controls the rotational speed of the motor via the PWM signal. A shunt resistor R38 is connected between a ground (GND) potential and the n-channel MOSFET for measuring a motor current and producing the SAMP1 signal. The SAMP1 signal is filtered by an RC filter R8 and C1. The filtered SAMP1 signal is amplified by a one stage amplifier (OP-AMP UA1). The rotational direction of the motor is controlled by two relays, RY1 and RY2. The HALL filter is an RC filter created by the resistor/capacitor combinations R63/C32, R68/C33, R70/C34, and R71/C35. Four filters are shown in FIG. 5 as two motors are usually used (one for each of the two legs of a desk) and two Hall pulse generators are used for each motor.

During normal operation, the electric height-adjustable desk operates stably, without shocks, and protection will not be triggered. When the height-adjustable desk is struck during operation, a shock will be generated; the shock is transmitted to the shock switch, and the shock switch triggers the MCU to carry out protection.

The electric height-adjustable desk is generally composed of two or three electric height-adjustable posts, which must maintain synchronous operation in order to ensure level operation of a desktop. Thus, during operation, each electric height-adjustable post must adjust speed in a timely manner in order to achieve synchronous operation; in general, speed is changed by PWM, and this is analogous to changing a power supply voltage of the electric motor in order to change speed. Adjustment is generally performed in the following manner: when A falls behind B, the voltage of A is increased (in fact, the PWM Duty Cycle is increased, likewise hereinbelow), the voltage of B is decreased, and A is then faster than B; when A passes B, it is necessary to decrease the voltage of A, and increase the voltage of B; in this way, the voltages of A and B are continually adjusted in a cyclic manner in order to achieve synchronous operation. Since the electric motor voltage of each electric height-adjustable post is changing continually, the current thereof will naturally change continually. In this situation, in order to prevent erroneous protection, it is necessary to increase a current change threshold for triggering protection (exceeding a current fluctuation value), thereby causing protection to be more dull, i.e. a greater impact force is needed in order to carry out protection.

The present application employs PID (Proportional-Integral-Derivative) automatic control technology for synchronous processing; by means of this control technology, each height-adjustable post can automatically maintain operation at a uniform speed according to a set speed and a set target position. Synchronous operation can be achieved by setting two or three height-adjustable posts to the same speed and the same target position. During operation, as long as the load of the height-adjustable post does not change, the voltage of the electric motor (in fact the PWM Duty Cycle) will not be adjusted again, i.e. will not change repeatedly, and correspondingly, current will not change repeatedly. This method of synchronous control has a stable current and will not add further current fluctuation, and can therefore increase the sensitivity of current detection.

What is claimed is:

1. An impact protection controller for an electric height-adjustable desk, comprising:
   a Micro Controller Unit (MCU);
   an electric motor drive circuit controlled by the Micro Controller Unit (MCU), said electric motor drive circuit comprising an n-channel MOSFET for controlling a rotational speed of an electric motor via a pulse width modulation (PWM) signal;
   a current amplification circuit;
   an electric motor current sampling circuit comprising a shunt connected between a ground potential and the n-channel MOSFET for measuring an electric motor current and an RC filter connected to the shunt for filtering the measured electric motor current, said electric motor current sampling circuit configured to sample the electric motor current for transmission to the Micro Controller Unit (MCU) via the current amplification circuit; with the electric motor current being used for detecting a change in current;
   a HALL filter comprising an RC filter for filtering out noise from the motor; and
   a HALL pulse generator transmitting a signal to the Micro Controller Unit (MCU) via the HALL filter.

2. The impact protection controller of claim 1, wherein a combination of current detection and shock detection is used for impact protection.

3. The impact protection controller of claim 1, further comprising a shock switch disposed outside the Micro Controller Unit (MCU) and connected to the Micro Controller Unit (MCU).

4. The impact protection controller of claim 1, further comprising a shock switch disposed inside the Micro Controller Unit (MCU).

5. The impact protection controller of claim 1, further comprising a Proportional-Integral-Derivative control technology.

6. The impact protection controller of claim 5, wherein the Proportional-Integral-Derivative control technology is used to automatically maintain operation at a uniform speed according to a set speed and a set target position.

7. The impact protection controller of claim 1, wherein the electric motor drive circuit further comprises two relays for controlling a rotational direction of the motor.

8. The impact protection controller of claim 1, wherein the current amplification circuit is a one-stage amplifier.

* * * * *